(12) United States Patent
Schoepf et al.

(10) Patent No.: US 6,833,713 B2
(45) Date of Patent: Dec. 21, 2004

(54) SMART WIRE HARNESS FOR AN ELECTRICAL CIRCUIT

(75) Inventors: Thomas J. Schoepf, Rochester Hills, MI (US); Malakondaiah Naidu, Troy, MI (US); Suresh Gopalakrishan, Sterling Heights, MI (US)

(73) Assignee: Delphi Technologies, Inc., Troy, MI (US)

( * ) Notice: Subject to any disclaimer, the term of this patent is extended or adjusted under 35 U.S.C. 154(b) by 1 day.

(21) Appl. No.: 10/355,567

(22) Filed: Jan. 31, 2003

(65) Prior Publication Data

US 2004/0150410 A1 Aug. 5, 2004

(51) Int. Cl.$^7$ .......................... H01H 9/50; G01R 31/00; H02H 9/08
(52) U.S. Cl. .......................... 324/536; 702/58; 361/42
(58) Field of Search .......................... 324/536, 512, 324/500, 424, 503, 533; 361/42, 48, 115, 227; 340/652; 180/268; 702/58, 108

(56) References Cited

U.S. PATENT DOCUMENTS

| | | | |
|---|---|---|---|
| 4,807,160 A | 2/1989 | Nozaki | |
| 4,956,561 A | 9/1990 | Tamer | |
| 4,959,792 A | * 9/1990 | Sullivan | ............... 702/58 |
| 5,264,796 A | * 11/1993 | Klassen et al. | ............... 324/503 |
| 5,268,644 A | 12/1993 | Klassen et al. | |
| 5,894,393 A | * 4/1999 | Elliott et al. | ............... 361/42 |
| 5,903,156 A | 5/1999 | Matsumaru et al. | |
| 6,049,143 A | * 4/2000 | Simpson et al. | ............... 307/126 |
| 6,086,385 A | 7/2000 | Wang et al. | |
| 6,087,800 A | * 7/2000 | Becker et al. | ............... 318/778 |
| 6,142,813 A | 11/2000 | Cummings et al. | |
| 6,162,085 A | 12/2000 | Chugh et al. | |
| 6,171,146 B1 | 1/2001 | Fink et al. | |
| 6,179,658 B1 | 1/2001 | Gunay et al. | |
| 6,203,364 B1 | 3/2001 | Chupak et al. | |
| 6,208,233 B1 | 3/2001 | Stein, Sr. et al. | |
| 6,222,374 B1 | 4/2001 | Shoemaker | |
| 6,227,062 B1 | 5/2001 | Doman | |
| 6,229,679 B1 | 5/2001 | Macbeth | |
| 6,247,951 B1 | 6/2001 | Di Liello et al. | |
| 6,247,965 B1 | 6/2001 | Cummings et al. | |
| 6,275,044 B1 | 8/2001 | Scott | |
| 6,300,766 B1 | 10/2001 | Schmalz | |
| 6,305,957 B1 | 10/2001 | Fink et al. | |
| 6,313,641 B1 | * 11/2001 | Brooks | ............... 324/536 |
| 6,323,656 B2 | 11/2001 | Shoemaker | |

(List continued on next page.)

Primary Examiner—Anjan Deb
Assistant Examiner—Hoai-An D. Nguyen
(74) Attorney, Agent, or Firm—David P. Wood

(57) ABSTRACT

A direct current electrical circuit having a smart wire harness that has integrated electronics which measure both voltage and current through wires of the harness to detect and protect the electrical current from parallel and serial arc faults occurring within a protection zone. The protection zone is disposed directly between two smart connectors of the wire harness which are in communication with one another via a series of signal wires of the harness to detect serial or parallel arc faults within the protection zone. To measure serial arc faults, a voltage drop of the positive wire is measured at each smart connector and a difference taken which equals the serial arc voltage. If this voltage differential increases to a preset value, a switching device which provides power to the smart wire harness is opened. To detect parallel arc faults, that is those arcs which jump between the positive wire and the ground wire of the wire harness, a current is measured at both ends of the positive wire of the wire harness via the same smart connectors. If the ending current is less than the beginning current, signaling a parallel arc fault due to the arc resistance of the arc itself, the same switching device is opened.

13 Claims, 3 Drawing Sheets

U.S. PATENT DOCUMENTS

| | | |
|---|---|---|
| 6,338,651 B1 | 1/2002 | Svette, Jr. et al. |
| 6,345,706 B1 | 2/2002 | Oliver et al. |
| 6,406,307 B2 | 6/2002 | Bungo et al. |
| 6,437,963 B1 * | 8/2002 | Hamilton et al. ........... 361/227 |
| 6,443,137 B1 | 9/2002 | Kraft et al. |
| 6,494,751 B1 | 12/2002 | Morello et al. |
| 6,508,666 B1 | 1/2003 | Francis |
| 6,533,588 B1 | 3/2003 | Woith et al. |
| 6,533,611 B2 | 3/2003 | Morello et al. |
| 6,535,396 B1 | 3/2003 | Degenkolb et al. |
| 6,556,118 B1 | 4/2003 | Skinner |
| 6,565,372 B2 | 5/2003 | Bakker et al. |
| 6,578,444 B1 | 6/2003 | Wendelin |
| 6,454,060 B1 | 9/2003 | Lisenker et al. |
| 2001/0029433 A1 * | 10/2001 | Scott ........................... 702/58 |
| 2002/0130668 A1 * | 9/2002 | Blades ........................ 324/536 |
| 2003/0151478 A1 * | 8/2003 | Radosavljevic et al. ...... 335/18 |

\* cited by examiner

SMART WIRE HARNESS FOR AN ELECTRICAL CIRCUIT

TECHNICAL FIELD

The present invention relates to an electrical circuit, and more particularly to a direct current electrical circuit having a smart wire harness capable of detecting arc faults.

BACKGROUND OF THE INVENTION

An automotive industry need exists to increase the electrical power capability for future vehicles. In fact, the automotive industry plans to increase direct current systems from 14 volts to 42 volts. The driving forces contributing toward this change are the need to reduce fuel consumption and the introduction of new electrical features. New power networks must accommodate the increase energy demand of comfort and security devices as well as the electrical needs of major systems such as braking, electric power steering and suspension systems. The introduction of a system voltage higher than approximately 20 volts, defined herein as high system voltage, forces considerable component and system changes regarding reliability and electrical safety. More specifically, the impact of a forty-two volt direct current network on electrical distributions systems and components focuses primarily on the arcing phenomenon. A need exists to protect wire harnesses from unwanted arc faults, which may occur as a result of cut, pinched or chaffed wiring.

In the instance of a wire being cut or broken under an electrical load, an arc may be drawn between both ends. Such an arc is unwanted and unplanned for, and its extinction is uncertain. Therefore, severe damage may occur if the arc is sustained. This type of arc fault is called a series arc fault, as the arc is in series to the load. Hot unplugs due to vibrating loose connections fall into the same series arc fault category. Series arc faults cannot typically be cleared by fuses or circuit breakers.

Arc faults in parallel to the load are identified as parallel arc faults. An example of parallel arc faults can be damaged wires drawing an arc to a ground potential, such as a chassis of an automobile. The insulation jacket of such wires might be broken due to aging or shaved, chaffed or pinched cable jackets. This type of arc fault is usually created by a temporary short circuit. The arc fault current however may thermally over load and damage contacts within the circuit due to low contact force resulting in melting and evaporating contact material followed by more arcing. The arc fault current, limited by the circuit impedance and the arc voltage, can be significantly lower than the trip current of the protection device such as a fuse or circuit breaker, so that the fault is cleared late depending on the time or current characteristics or in some cases not at all.

SUMMARY OF THE INVENTION

A direct current electrical circuit having a smart wire harness has integrated electronics which measure both voltage and current through wires of the harness which are located substantially within a protection zone. The protection zone is disposed directly between two smart connectors which are wired in series via the wire harness to detect serial or parallel arc faults within the protection zone. To measure serial arc faults, a voltage is measured at each smart connector and a difference taken which equals the serial arc voltage. If this differential voltage increases to a preset value, a switching device which provides power to the smart wire harness is opened. To detect parallel arc faults, that is those arcs which jump between a positive wire and a ground wire of the wire harness, the current is measured at both ends of a positive wire of the smart wire harness via the same smart connectors. If the ending current is less than the beginning current, signaling a parallel arc due to the arc resistance to the arc itself, the same switching device is opened.

Preferably, the smart wire harness requires two signal wires to transfer the values of the end voltage and end current from the smart end connector to the first or the beginning smart connector. Depending upon the number of positive wires carried by the wire harness, a multiplexer can be used in the end smart connector and a demultiplexer can be used in the beginning smart connector to reduce the number of required signal wires.

Features and advantages of the present invention include a smart wire harness which can be used in a high voltage system. Another advantage of the present invention is a relatively inexpensive and robust wire harness capable of detecting both serial and parallel arc faults and capable of reacting to such faults to prevent further circuit damage.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
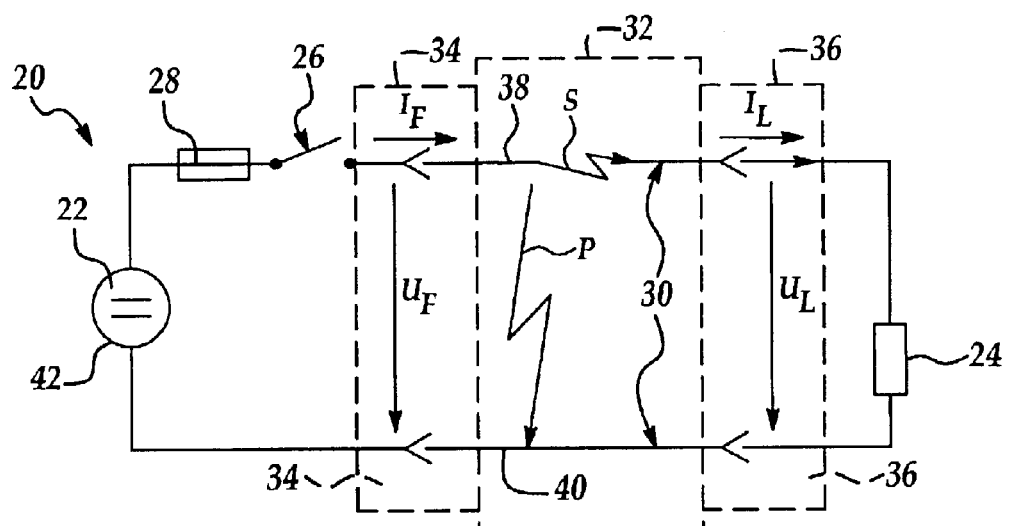
FIG. 1 is a schematic of a simplified electrical circuit of the present invention illustrating a parallel arc fault and a serial arc fault both located within a protection zone.

Referring to FIG. 1, a simplified electrical circuit 20 is illustrated having a direct current power source or battery 22 which experiences an integral electrical circuit resistance while powering a load 24. The circuit 20 has a switching device 26 such as a relay wired in series between a circuit breaker or fuse 28 and the load 24. The fuse 28 is designed to protect the circuit 20 including the switching device 26, the load 24 and a smart wire harness 30 located substantially within a protection zone 32 shown in phantom. A first smart unit or connector 34 of the harness 30 is disposed directly adjacent to the protection zone 32 and generally between the zone 32 and the switch 26. A second or end smart unit or connector 36 of the harness 30 is disposed directly adjacent to the protection zone 32 and generally between the zone 32 and the load 24. Both smart connectors 34, 36 internally measure voltage drops and currents at positive and negative conductors or wires 38, 40 of the wire harness 30. The positive wire 38 and the negative wire 40 of the wire harness 30 are routed in parallel through the protection zone 32 from the first to the second smart connectors 34, 36. The smart units 34, 36 of the smart wire harness 30 may take the form of any housing which supports internal electronics or can be mating connectors having integrated electronics to detect arc faults and control the relay or power switch 26 or the circuit breaker 28.

To protect the wire harness 30, the electrical circuit 20 is capable of distinguishing between two types of arc faults via the smart connectors 34, 36. The first is a serial arc fault S and the second is a parallel arc fault P. Both are illustrated within the protection zone 32 acting upon the wire harness 30. Because the fuse or circuit breaker 28 and power switch 26 are unable to protect the wire harness 30 during most serial or parallel arc fault scenarios, the first and second smart connectors 34, 36 measure voltage drops across the positive and negative wires 38, 40 internally and act to open the circuit breaker or power switch 26 when predefined voltage differentials are reached.

In regards to serial arc faults S, they act in series to the load 24 reducing current due to the additional resistance within the circuit 20. Such serial arc faults S may be created during the mating or unmating of circuit connectors 42 under load, a wire break, or a loose connection, such as a crimp or any other terminal connection in general. When using, for example, a forty-two volt battery power source 22, a serial arc fault S may be assumed if the difference between a first voltage drop $U_F$ measured internally across the first smart connector 34 minus a last voltage drop $U_L$ measured internally across the second smart connector 36 exceeds approximately a predetermined voltage differential limit preferably within a range of eight to ten volts. The voltage difference is calculated via the following first equation:

$$\Delta U = U_F - U_L \geq 10V$$

Of course a set point or predefined voltage differential limit of eight volts is more conservative than a voltage differential limit of ten volts (which is below the minimum arc voltage of most metals) and offers greater wire harness protection. However, even at eight volts, the normal operating voltage difference across the wire harness 30 is far below the eight volt threshold. Under normal operating conditions, the normal voltage difference across the wire harness 30 will be appreciably less than eight volts and can be calculated by the following equation:

$$\Delta U = U_F - U_n = I_F (\Sigma R_{wire,m} + \Sigma R_{contact,m})$$

Figure 2:
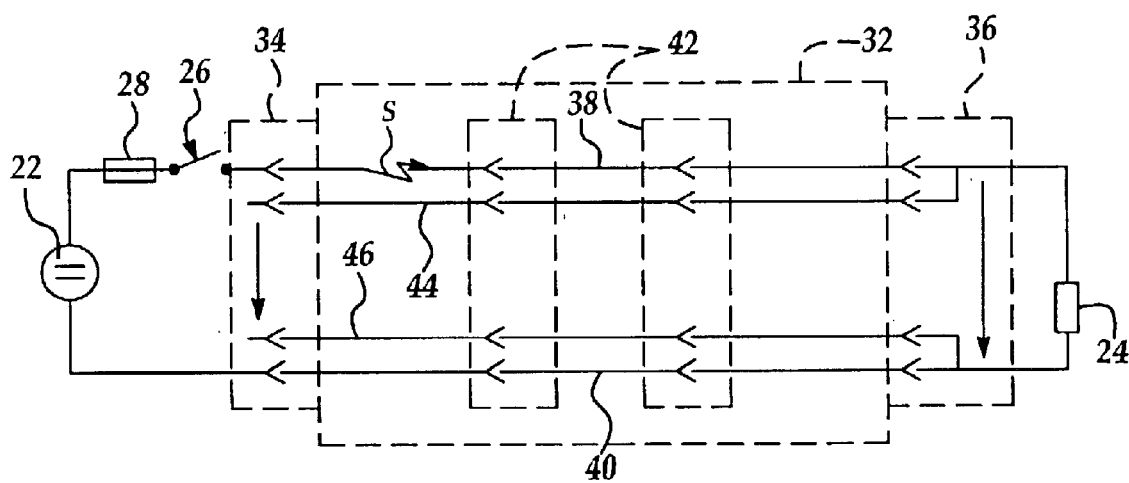
FIG. 2 is a schematic of the electrical circuit further detailing two voltage signal wires for the detection of serial arc faults.

In such an equation, the resistance of the wires 38, 40 within the wire harness 30 and the resistance contributed via contacts of connectors 42, as best shown in FIG. 2, are summed and taken into consideration. For the above equation, $U_n$ is the voltage drop at the last connector of the smart wire harness 30, $R_{wire,m}$ is the resistance of the positive wire 38 between two connectors, $R_{contact,m}$ is the contact resistance of one connection, and "n" is the number of connectors 42 located within the protection zone 32.

A serial arc outside the protection zone 32, for instance close to the load 24 cannot be detected by the smart connectors 34, 36. Such a serial arc must be dealt with by normal switching operation of the switching device 26. Moreover, all circuit breakers, switches and relays must be located outside the protection zone 32, otherwise, a normal switching operation will be treated as a serial arc fault S.

Referring to FIG. 2, the wire harness 30 requires two smart connectors 34, 36 and two signal wires 44, 46. The two signal wires 44, 46 transfer the values of the last voltage drop $U_L$ from the last or second smart connector 36 to the first smart connector 34 wherein the signals are processed and possible triggering of the switching device 26 is initiated. Signal wire 44 is connected electrically to the positive wire 38 within the smart connector 36 and signal wire 46 is connected electrically to the ground wire 40 inside the smart connector 36. However, the electrical circuit 20 as illustrated in FIG. 2 is not capable of detecting parallel arc faults P within the protection zone 32 without a third signal wire.

Figure 3:
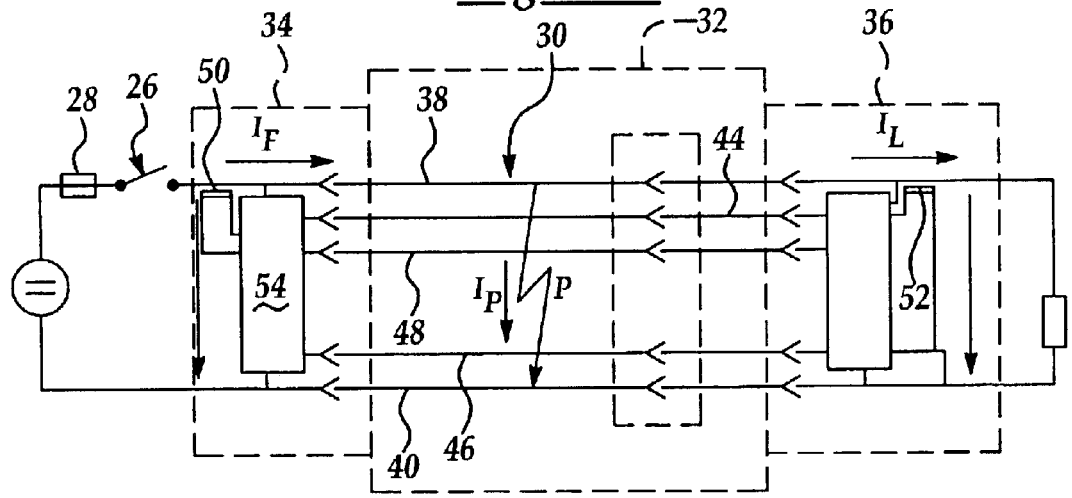
FIG. 3 is a schematic of the electrical circuit further detailing a current signal wire and a current sensor for the detection of parallel arc faults.

Referring to FIGS. 1 and 3 and in further regards to parallel arc faults P, an arc is generated between the positive and negative conductors 38, 40 of the wire harness 30, which limits the circuit current due to its resistance. In this case, the limited current created by the parallel arc fault P is lower than the maximum current required to blow the fuse 28 or open the switching device 26. Therefore, the fuse 28 and switching device 26 will not be able to detect the parallel arc fault P and thus will not be able to cut off power from the battery or power source 22. Such parallel arc faults P are for instance caused by wet arc tracking failures which cannot be detected. Other failures include wire breaks, loose connections, touching other voltage levels or damaged or aging chaffed electrical insulation jackets of the wire harness 30.

In order to detect parallel arc faults P, a first or total system current $I_F$ is measured across the positive conductor internal to the first smart connector 34, and a second or last current $I_L$ is measured across the positive conductor 38 internal to the last smart connector 36. In the event of a parallel arc fault P, the arc generates a current path $I_P$ parallel to the load, so the total circuit current $I_F$ does not equal the last or load current $I_L$. The parallel arc current $I_P$ is thus defined as the difference between the total circuit current $I_F$ minus the load current $I_L$.

As previously disclosed, arc fault detection is conducted via monitoring of voltages and currents at the beginning and at the end of the wire harness 30 and directly adjacent to the protection zone 32. Whenever the difference in voltage exceeds the predetermined threshold voltage differential limit of eight volts and/or the current path $I_P$ travelling through the parallel arc fault P exceeds a defined scatter of about 0.01 amps (this is in accordance with minimum arc current of carbon) the switching device 26 switches off the power from the battery 22 within a very short response time, generally in the area of milliseconds.

Referring to FIG. 3, a further detail of the same electrical circuit 20 illustrated in FIG. 1 is shown which is necessary to detect parallel arc faults P. This detail includes a third signal wire 48 which is routed through the protection zone 32 between the first and last smart connectors 34, 36 for transferring the last or load current $I_L$ from the last smart connector 36 to the first smart connector 34. The last smart connector 36 also has an integral current detector 52 which generates the signal or last current $I_L$ transferred via the signal wire 48 to a first channel or amplifier of a dual comparator 54 disposed internal to the first smart connector 34. An integral current detector 50 of the first smart connector 34 measures the first current $I_F$ and outputs the signal to the same channel of the dual comparator 54 to determine if a parallel arc fault P exists by determining the presence of the current path $I_P$. The current detectors 50, 52 can be any variety of current detectors including that of a Hall or shunt sensor. A second channel or amplifier of the dual comparator 54 processes the voltage drops $U_F$, $U_L$ and calculates for the voltage differential limit.

Figure 4:
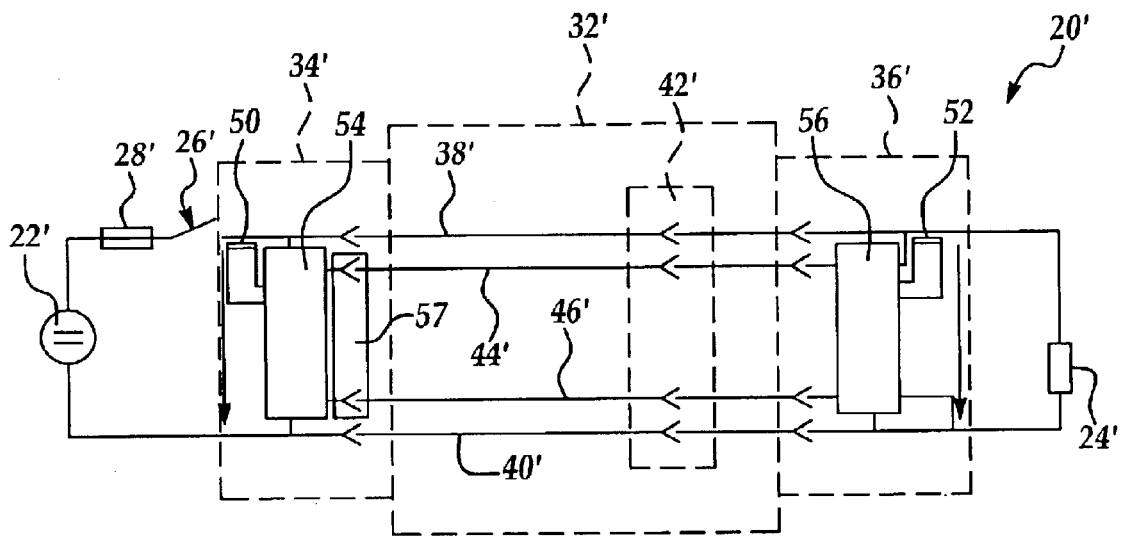
FIG. 4 is a schematic of a second embodiment of an electrical circuit which utilizes a multiplexer and a de-multiplexer to eliminate one of the three signal wires of the first embodiment.

Referring to FIG. 4, a second embodiment of the electrical circuit 20' is illustrated which utilizes a multiplexer 56 disposed within the second smart connector 36' and a de-multiplexer 57 disposed within the first smart connector 34' to eliminate the third or current signal wire 48 of the first embodiment. The signal wire 44' serves to sequentially transfer the load current $I_L$ (in the form of voltage) and the last voltage drop $U_F$ of the positive wire 38' at the last smart connector 36' to the de-multiplexer 57 which then transfers the separated signals to the comparator 54'. The signal wire 46', like the first embodiment, remains as the voltage reference leg and extends through both the multiplexer 56 and the de-multiplexer 57. Of course, because the electric circuit 20' is illustrated with only one positive wire 38' within the protected harness 30', the cost of the multiplexer 56 and the de-multiplexer 57 may be prohibitive, and thus the third signal wire 48 of the first embodiment may be preferred. However with multiple positive wires or conductors, multiplexing can be cost beneficial.

Figure 5:
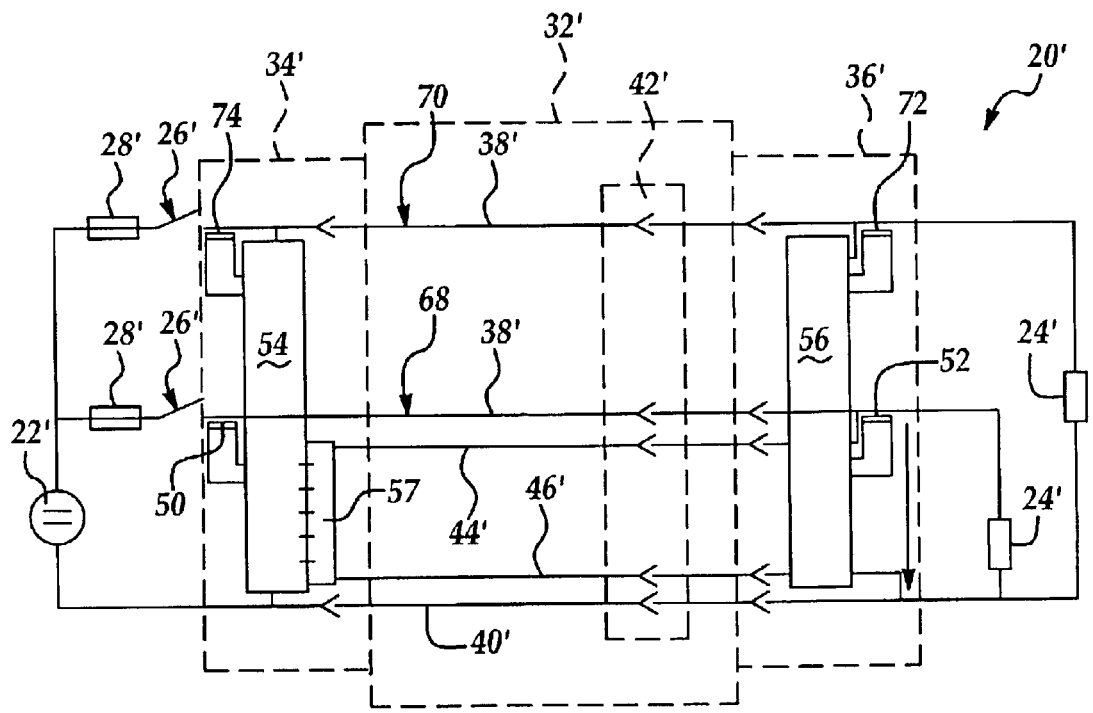
FIG. 5 is a schematic of the second embodiment further detailing a second positive wire disposed in series to the first positive wire of FIG. 4.

Referring to FIG. 5, a first leg 68 is identified as having the fuse or circuit breaker 28', the switching device 26', the positive wire 38', and the load 24'. A substantially identical second leg 70 is wired parallel to the first leg 68 and shares the common negative wire 40' to complete the circuit. The second leg 70 is orientated within the first and last smart connectors 34', 36' and extends through the protection zone 32' similarly to the first leg 68 and is thus similarly protected from arc faults. The multiplexer 56, de-multiplexer 57 and the comparator 54 are constructed and arranged to operate or include the second leg 70. As illustrated, the multiplexer 56 receives an additional current signal from a current detector 72 for the second leg 70 at the last smart connector 36' and the comparator 54 receives an additional current signal from another current detector 74 for the second leg integrated into the first smart connector 34'. Therefore, the de-multiplexer 57 has five outputs which amount to: two current signals, two voltage signals, and a voltage reference signal.

Because each leg 68, 70 has its own switching device 26', the de-multiplexer outputs the current signal to two respective current amplifiers or sub-comparators of the comparator 54, and likewise, the two voltage signals outputted from the de-multiplexer 57 are inputted to two respective voltage amplifiers or sub-comparators. With use of the multiplexer 56 and even though the electrical circuit 20' has at least one additional second leg 70, no additional signal wires are required from the previously described signal wires 44' and 46', of FIG. 4.

Figure 6:
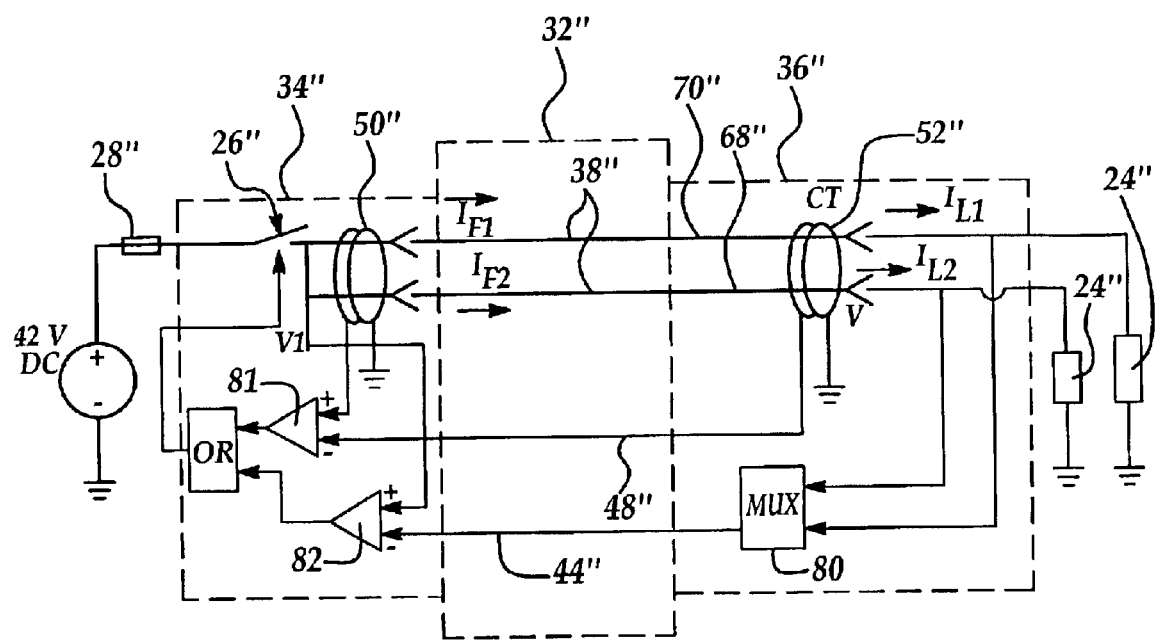
FIG. 6 is a schematic of a third embodiment of an electrical circuit.

Referring to FIG. 6, a third embodiment of an electrical circuit 20" is illustrated which is grounded directly to, for instance, the chassis of an automobile. The chassis grounding eliminates the negative wire 40 of the first and second embodiments. Because the negative wire 40 is eliminated, the ground reference or voltage signal wire 46 is also eliminated. Instead, the circuit is grounded directly to, for instance, the chassis of an automobile. Furthermore, the positive legs 68", 70" are wired in series to, and thus share a common switching device 26". That is, the legs 68", 70" do not each have an independent switch as does the second embodiment, instead, the common switch 26" is utilized to cut power to both legs when an arc fault is detected.

Coiled-type current detectors 50" and 52" of electrical circuit 20" measure the respective combined current signals $I_{L1}$, $I_{L2}$ of the positive wires 38" of both legs 68", 70". The combined current signal is transferred to a comparator 81 of the dual comparator 54" via the signal wire 48" for comparison to a combined current signal, $I_{F1}$, $I_{F2}$ measured by the current detector 50". Similarly, a multiplexer 80 located preferably within the final smart connector 36" is utilized to multiplex the voltage signals from both legs 68", 70" at the last smart connector 36". The combined voltage signal is then delivered via the voltage signal wire 44". A de-multiplexer within the first smart connector 34" is not required because the multiplexer 80 adds the voltage signal which need not be separated as separate signals within the first smart connector 34". The added voltage signal sent through signal wire 44" is inputted into a comparator 82 of the dual comparator 54". If a threshold voltage is reached, the switching device 26" will open, thus cutting power to both legs 68", 70".

Although the preferred embodiments of the present invention have been disclosed, various changes and modifications can be made thereto by one skilled in the art without departing from the scope and spirit of the invention as set forth in the appended claims. For example, the signal wires can be replaced with a standard buss such as a Controller Area Network, CAN, or a Local Area Network, LAN, bus to communicate the measured values of current and voltages. It is also understood that the terms used here and are merely descriptive rather than limiting and that various changes maybe made without departing from the scope and spirit of the invention.

What is claimed is:

1. A smart wire harness for detecting serial and parallel arc faults, the wire harness comprising:

a positive conductor having a first voltage and a second voltage;

a first smart connector for measuring the first voltage;

a second smart connector for measuring the second voltage, wherein positive conductor is engaged electrically between the first and second smart connectors so that the first and second connectors are wired in series for detecting a serial arc fault across the positive conductor;

a first signal wire for transferring the value of the second voltage from the second smart connector to the first smart connector; and a switching device for providing electrical power to the positive conductor, wherein the switching device is constructed and arranged to open when a predetermined voltage differential limit is exceeded indicating a serial arc fault;

wherein the switching device opens when the difference between the quantity of the second voltage minus a second reference voltage and the quantity of the first volume minus a first reference voltage exceeds the voltage differential limit.

2. The smart wire harness set forth in claim 1 comprising:

a first current of the positive conductor measured at the first smart connector via a first current detector;

a second current of the positive conductor measured at the second smart connector via a second current detector;

a second signal wire for transferring the value of the second current from the second smart connector to the first smart connector; and wherein the switching device opens when the second current is less than the first current indicating a parallel arc fault across the positive conductor.

3. The smart wire harness set forth in claim 2 comprising:

a negative conductor wired in parallel to the positive conductor and engaged electrically between the first and second smart connectors, the negative conductor having the first reference voltage measured at the first smart connector and the second reference voltage measured at the second smart connector;

a third signal wire for transferring the value of the second reference voltage from the second smart connector to the first smart connector.

4. The smart wire harness set forth in claim 3 comprising a comparator housed within the first smart connector, wherein the comparator receives and processes the first voltage, the first current, the first reference voltage, the second voltage, the second current, and the second reference voltage.

5. The smart wire harness set forth in claim 2 wherein the first and second current detectors are Hall sensors.

6. The smart wire harness set forth in claim 2 wherein the first and second current detectors are shunt sensors.

7. A smart wire harness for detecting serial and parallel arc faults, the wire harness comprising:
 a positive conductor having a first voltage and a second voltage;
 a first smart connector for measuring the first voltage;
 a second smart connector for measuring the second voltage, wherein positive conductor is engaged electrically between the first and second smart connectors so that the first and second connectors are wired in series for detecting a serial arc fault across the positive conductor;
 a first signal wire for transferring the value of the second voltage from the second smart connector to the first smart connector;
 a switching device for providing electrical power to the positive conductor, wherein the switching device is constructed and arranged to open when a predetermined voltage differential limit is exceeded indicating a serial arc fault;
 a first current of the positive conductor measured at the first smart connector;
 a second current of the positive conductor measured at the second smart connector;
 a negative conductor wired in parallel to the positive conductor and engaged electrically between the first and second smart connectors;
 a multiplexer utilized with the second smart connector for transferring the value of the second current and the second voltage across the first signal wire;
 a de-multiplexer utilized with the first smart connector for separating the values of the second voltage and the second current received from the first signal wire; and
 wherein the switching device opens when the second current is less than the first current indicating a parallel arc fault across the positive conductor.

8. The smart wire harness set forth in claim 7 comprising:
 the negative conductor having a first reference voltage measured at the first smart connector and a second reference voltage measured at the second smart connector;
 a third signal wire for transferring the value of the second reference voltage from the second smart connector to the first smart connector; and
 wherein the switching device opens when the difference between the quantity of the second voltage minus the second reference voltage and the quantity of the first voltage minus the first reference voltage exceeds the voltage differential limit.

9. The smart wire harness set forth in claim 8 comprising a
 comparator housed within the first smart connector, wherein the comparator receives and processes the first voltage, the first current, the first reference voltage, the second voltage, the second current, and the second reference voltage.

10. A direct current electrical circuit comprising:
 a protection zone;
 a smart wire harness for detecting serial and parallel arc faults, the smart wire harness having;
 a positive conductor extending through the protection zone, the positive conductor having a first voltage and a second voltage, a first smart unit for measuring the first voltage, a second smart unit for measuring the second voltage, wherein the protection zone is disposed between the first and second smart connectors and wherein the positive conductor is engaged electrically between the first and second smart units so that the first and second smart units are wired in series for detecting a serial arc fault across the positive conductor, and
 a first signal wire for transferring the value of the second voltage from the second smart connector to the first smart connector;
 a switching device for providing electrical power to the positive conductor, wherein the switching device is constructed and arranged to open when the difference between the quantity of the second voltage minus a second reference voltage and the quantity of the first voltage minus a first reference voltage exceeds a predetermined voltage differential limit indicating a serial arc fault;
 a direct current power source engaged electrically between the switching device and a chassis ground, wherein the switching device is disposed between the power source and the first smart unit; and
 a load engaged electrically between the positive conductor and the chassis ground, wherein the second smart unit is disposed between the protection zone and the load.

11. The direct current electrical circuit set forth in claim 10 comprising:
 a first current of the positive conductor measured at the first smart unit via a first current detector;
 a second current of the positive conductor measured at the second smart unit via a second current detector; a second signal wire for transferring the value of the second current from the second smart unit to the first smart unit; and
 wherein the switching device opens when the second current is less than the first current indicating a parallel arc fault across the positive conductor.

12. The direct current electrical circuit set forth in claim 11 comprising:
 a plurality of positive conductors, wherein the positive conductor is one of the plurality of positive conductors; and
 the first and second current detectors being coiled-type of current sensors wherein the first current detector is coiled about the plurality of positive conductors at the first smart unit and wherein the second current detector is coiled about the plurality of positive conductors at the second smart unit.

13. A direct current electrical circuit comprising:
 a protection zone and a smart wire harness for detecting serial and parallel arc faults, the smart wire harness having;
 a positive conductor extending through the protection zone, the positive conductor having a first voltage and a second voltage, a first smart unit for measuring the first voltage, a second smart unit for measuring the second voltage, wherein the protection zone is disposed between the first and second smart connectors and wherein the positive conductor is engaged electrically between the first and second smart units so that the first and second smart units are wired in series for detecting a serial arc fault across the positive conductor, and a first signal wire for transferring the value of the second voltage from the second smart connector to the first smart connector;

a switching device for providing electrical power to the positive conductor, wherein the switching device is constructed and arranged to open when a predetermined voltage differential limit is exceeded indicating a serial arc fault;

a direct current power source engaged electrically between the switching device and a chassis ground, wherein the switching device is disposed between the power source and the first smart unit;

a plurality of positive conductors, wherein the positive conductor is one of the plurality of positive conductors;

a load engaged electrically between the positive conductor and the chassis around, wherein the second smart unit is disposed between the protection zone and the load; and a multiplexer disposed within the second smart unit which receives and multiples a plurality of second voltages of the plurality of positive conductors; and wherein a multiplexed voltage signal is sent from the adding multiplexer to a comparator disposed within the first smart unit.

* * * * *